United States Patent
Kuranaka et al.

[11] Patent Number: 5,962,155
[45] Date of Patent: Oct. 5, 1999

[54] FUEL CELL SYSTEM

[75] Inventors: Sou Kuranaka, Osaka; Takaharu Gamou, Fujiidera; Yoshio Morita, Suita; Kazuhito Hatoh, Daito, all of Japan

[73] Assignee: Matsushita Electric Industrial Co., Ltd., Osaka, Japan

[21] Appl. No.: 08/913,798

[22] PCT Filed: Jan. 16, 1997

[86] PCT No.: PCT/JP97/00069

§ 371 Date: Sep. 22, 1997

§ 102(e) Date: Sep. 22, 1997

[87] PCT Pub. No.: WO97/27637

PCT Pub. Date: Jul. 31, 1997

[30] Foreign Application Priority Data

Jan. 22, 1996 [JP] Japan ................................. 8-008127

[51] Int. Cl.$^6$ ............................................. H01M 8/18
[52] U.S. Cl. ........................ 429/20; 429/24; 429/25; 429/26; 429/33; 429/35; 429/17
[58] Field of Search ................................ 429/17, 20, 24, 429/25, 33, 35, 26

[56] References Cited

U.S. PATENT DOCUMENTS 5,527,632  6/1996  Gardner .................................. 429/17

FOREIGN PATENT DOCUMENTS

| | | |
|---|---|---|
| 2-170369 | 7/1990 | Japan . |
| 4-181659 | 6/1992 | Japan . |
| 5-29014 | 2/1993 | Japan . |
| 6-60894 | 3/1994 | Japan . |
| 6-76848 | 3/1994 | Japan . |
| 6-84536 | 3/1994 | Japan . |
| 6-150955 | 5/1994 | Japan . |
| 6-260202 | 9/1994 | Japan . |

*Primary Examiner*—Bruce F. Bell
*Attorney, Agent, or Firm*—Ratner & Prestia

[57] ABSTRACT

When a polymeric electrolyte type fuel cell operating at about 60° C. is used, heating with exhaust gas becomes difficult. Therefore, a polymeric electrolyte type fuel cell (PEM) is adopted as a fuel cell body, and a hydrogen storage vessel made of a metal containing hydrogen is connected to the PEM by a hydrogen supply piping via a humidifier for humidifying the electrolyte membrane of the PEM. The PEM and the hydrogen storage vessel are connected by a copper plate which is a conductor of heat. Heat generated in the PEM is transferred to the hydrogen storage vessel by this copper plate, and elevates the temperature and pressure in the vessel. By this, hydrogen is well supplied to the PEM.

10 Claims, 10 Drawing Sheets

21 : $TiMn_{0.6}Cr_{0.94}$

22 : $Ti_{0.8}Zr_{0.2}Mn_{0.8}Cr_{1.0}Cu_{0.2}$

23 : $Ti_{0.6}Zr_{0.4}Mn_{0.8}Cr_{1.0}Cu_{0.2}$

24 : $Ti_{0.4}Zr_{0.6}Mn_{0.8}Cr_{1.0}Cu_{0.2}$

25 : $Ti_{0.2}Zr_{0.8}Mn_{0.8}Cr_{1.0}Cu_{0.2}$

26 : $ZrMn_{1.5}Cr_{0.5}$

FUEL CELL SYSTEM

This application is the U.S. national-phase application of PCT International Application No. PCT/JP97/00069.

TECHNICAL FIELD

This invention relates to a fuel cell system in which a fuel cell and hydrogen absorbing alloys are combined.

BACKGROUND ART

In recent years, a fuel cell system in which a fuel cell and hydrogen absorbing alloys are combined has been used as a portable power source. Various constitutions of such a fuel cell system have been proposed (such as Japanese Patent Application Laid-Open Nos. 6-76848 and 6-60894).

Figure 9:
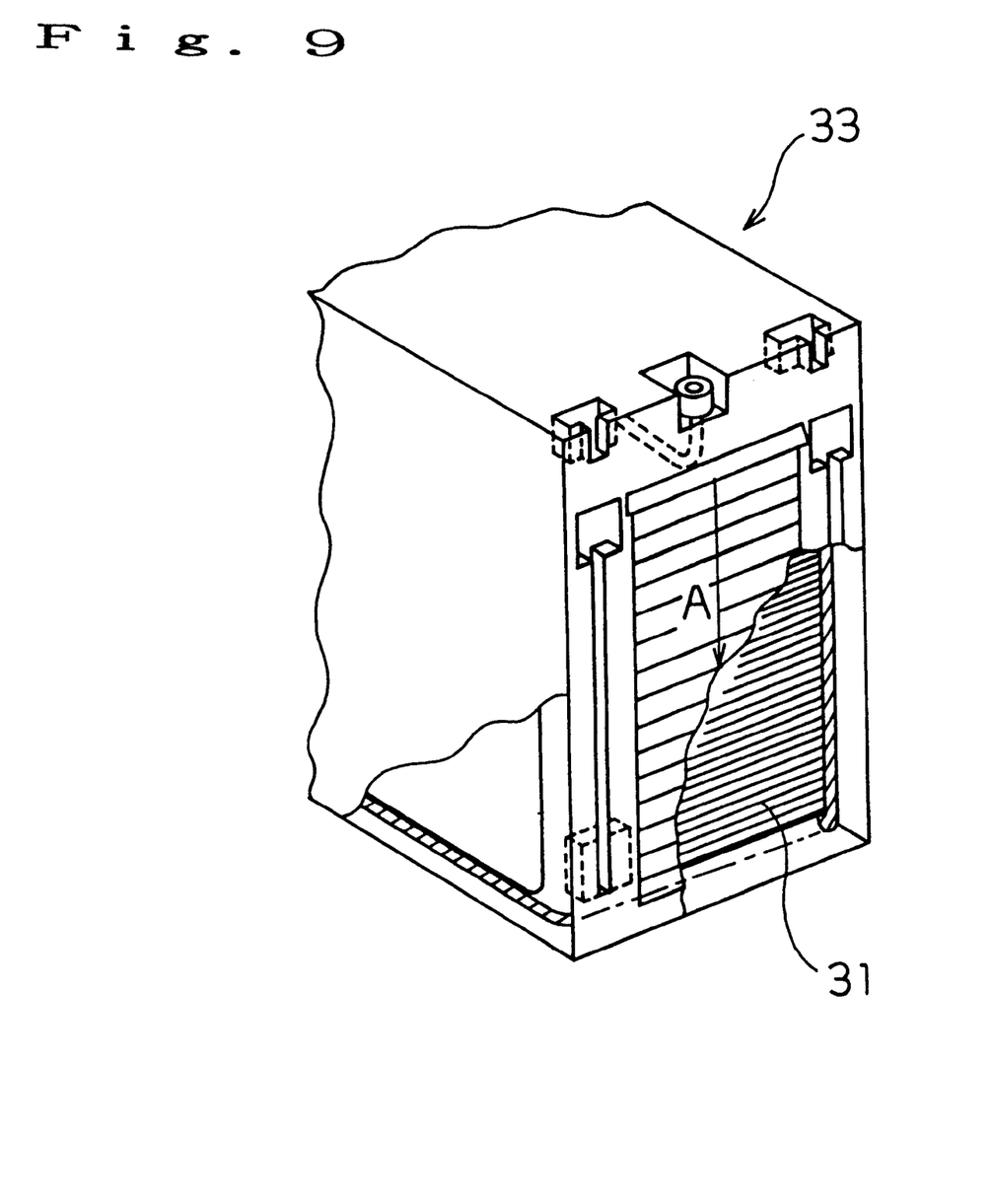
FIG. 9 is a perspective (partially sectional) view of a prior art fuel cell system.
Figure 10:
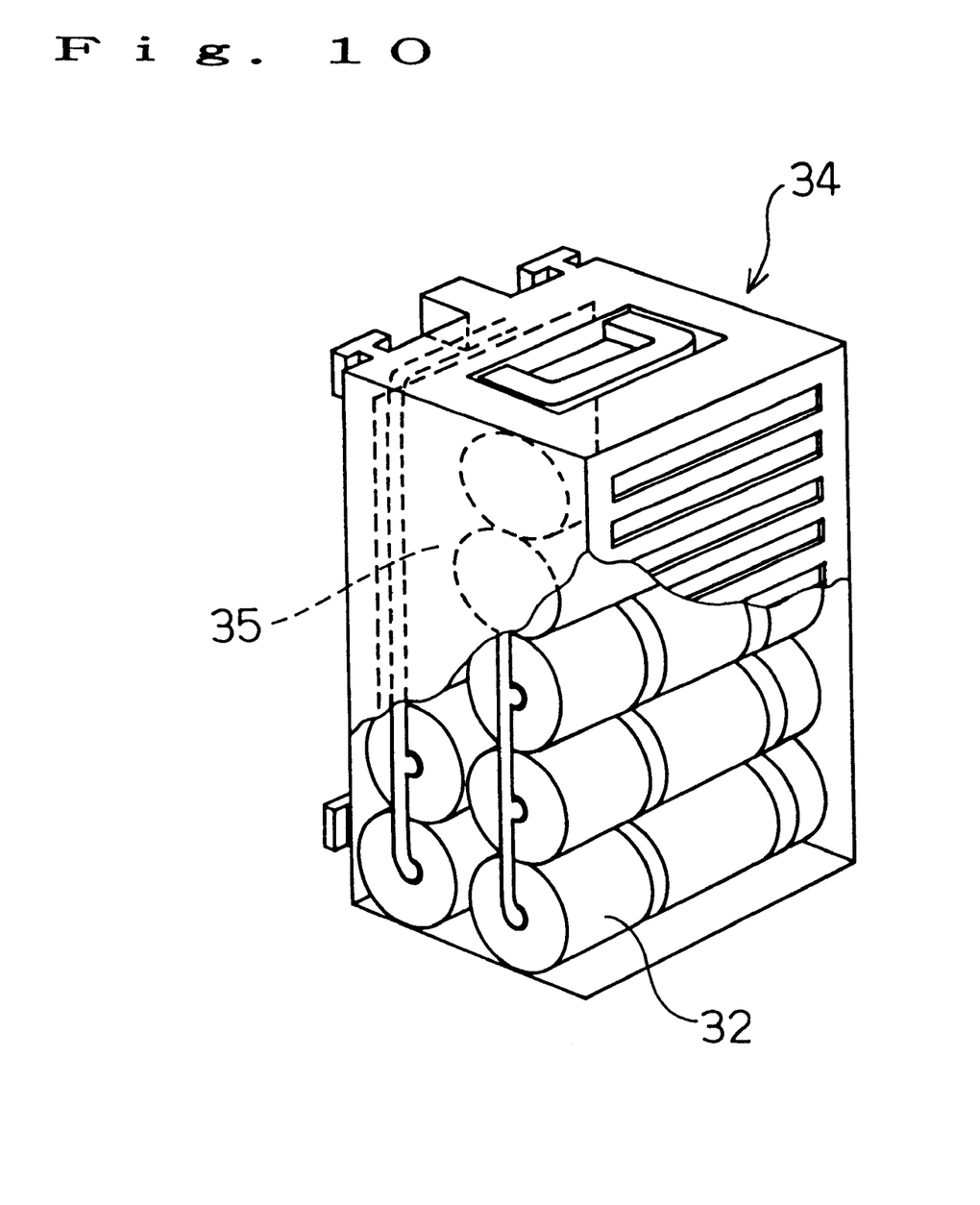
FIG. 10 is a perspective (partially sectional) view of a prior art fuel cell system.

Among these, as a typical conventional example, a constitution described in Japanese Patent Application Laid-Open No. 6-150955 will be described in detail referring to FIGS. 9 and 10.

In these drawings, cylinders 32 filled with hydrogen absorbing alloys which supply hydrogen to a fuel cell 31 are contained in a housing 34 of a portable structure independent from a power source body 33 containing the fuel cell 31, and in this housing 34, exhaust gas introducing section 35 is provided so that exhaust gas produced by the fuel cell 31 passes around the cylinders 32.

In this example, since the housing 34 containing the cylinders 32 has a portable structure independent from a power source body 33, the size of the housing 34 can be increased without spatial limitation for the cylinders 32. Also, in order to supply hydrogen smoothly, exhaust gas from the fuel cell 31 is introduced around the cylinders 32 so as to increase the temperature and pressure of the tank.

As the second example, as Japanese Patent Application Laid-Open No. 4-181659 describes, there was a fuel cell system in which the equilibrium hydrogen pressure at the upper limit of the plateau region of hydrogen absorbing alloys as a hydrogen storage means is 10 atm or below under an ordinary pressure, in order to enhance the safety of fuel cell systems.

Incidentally, in conventional fuel cell systems, since the type which operates at a relatively high temperature of 170° C. or above, such as a phosphoric acid type fuel cell, is used as the fuel cell body, cylinders were effectively heated by exhaust gas.

However, when a polymeric electrolyte type fuel cell operating at about 60° C. was used for further reducing the size of fuel cells for the use of electric appliances such as personal computers, and for generating electric power for a long period of time, there was a problem that heating by exhaust gas was difficult.

Furthermore, if the temperature of a hydrogen storage vessel in operation was not an ordinary temperature, and if the equilibrium hydrogen pressure at the upper limit of the plateau region of hydrogen absorbing alloys is 10 atm or below under an ordinary pressure, there was problems that the equilibrium hydrogen pressure in operation elevated when the temperature was higher than the normal temperature, and that the equilibrium hydrogen pressure in operation lowered when the temperature was lower than the normal temperature and that hydrogen can not be supplied.

DISCLOSURE OF THE INVENTION

It is an object of this invention to solve the problems described above, and to provide a small fuel cell system which can operate for a long period of time.

In order to solve the problems described above, the fuel cell of this invention comprises a fuel cell body and a hydrogen storage vessel which are linked together by a means that can supply and receive heat, such as a good conductor of heat.

This means that when the temperature of a hydrogen storage vessel in operation is an ordinary temperature or above, the supply and receipt of heat is to heat the hydrogen storage vessel with heat generated by the polymeric electrolyte type fuel cell body; and when the temperature of a hydrogen storage vessel in operation is an ordinary temperature or below, the supply and receipt of heat is to cool the polymeric electrolyte type fuel cell body by heat absorbed by the hydrogen storage vessel.

Furthermore, in addition to the main means that can supply and receive heat, a supplementary means that can supply and receive heat may be provided with a fan, whereby air is supplied to the fuel cell body.

The hydrogen storage vessel can be attached to or detached from the small system body.

Also, the equilibrium hydrogen pressure at the upper limit of the plateau region of hydrogen absorbing alloys in the hydrogen storage vessel is made 10 kg/cm$^2$g or below at the temperature of this hydrogen storage vessel in operation.

| | |
|---|---|
| 1 | Polymeric electrolyte type fuel cell (PEM) |
| 2 | Hydrogen storage vessel |
| 3 | Humidifier |
| 4 | Hydrogen supply piping |
| 5 | Fan |
| 6 | Housing |
| 7 | Suction port |
| 8 | Exhaust port |
| 9 | Copper plate |
| 10 | Hydrogen supply port |
| 11 | Quick connector |
| 12 | Hinge |
| 13 | Screw |
| 31 | Fuel cell |
| 32 | Cylinder |

-continued

| 33 | Power source body |
| 34 | Housing |
| 35 | Exhaust gas inlet |

BEST MODE FOR CARRYING OUT OF THE INVENTION

Embodiment of this invention will be described below referring to FIG. 1 through FIG. 8.

Embodiment 1

Figure 1:
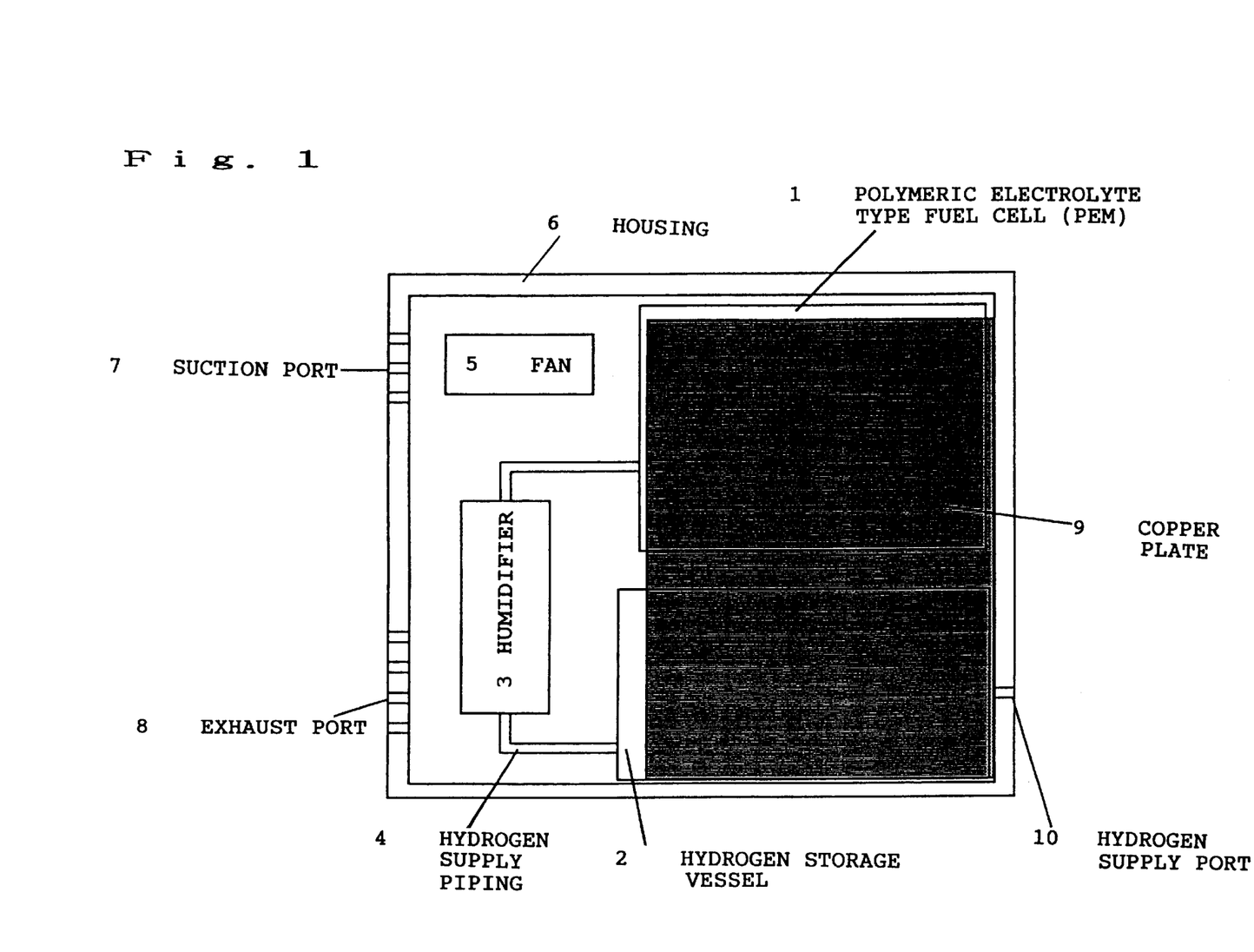
FIG. 1 is a first conceptual diagram of a fuel cell system which is a first embodiment of this invention.
Figure 2:
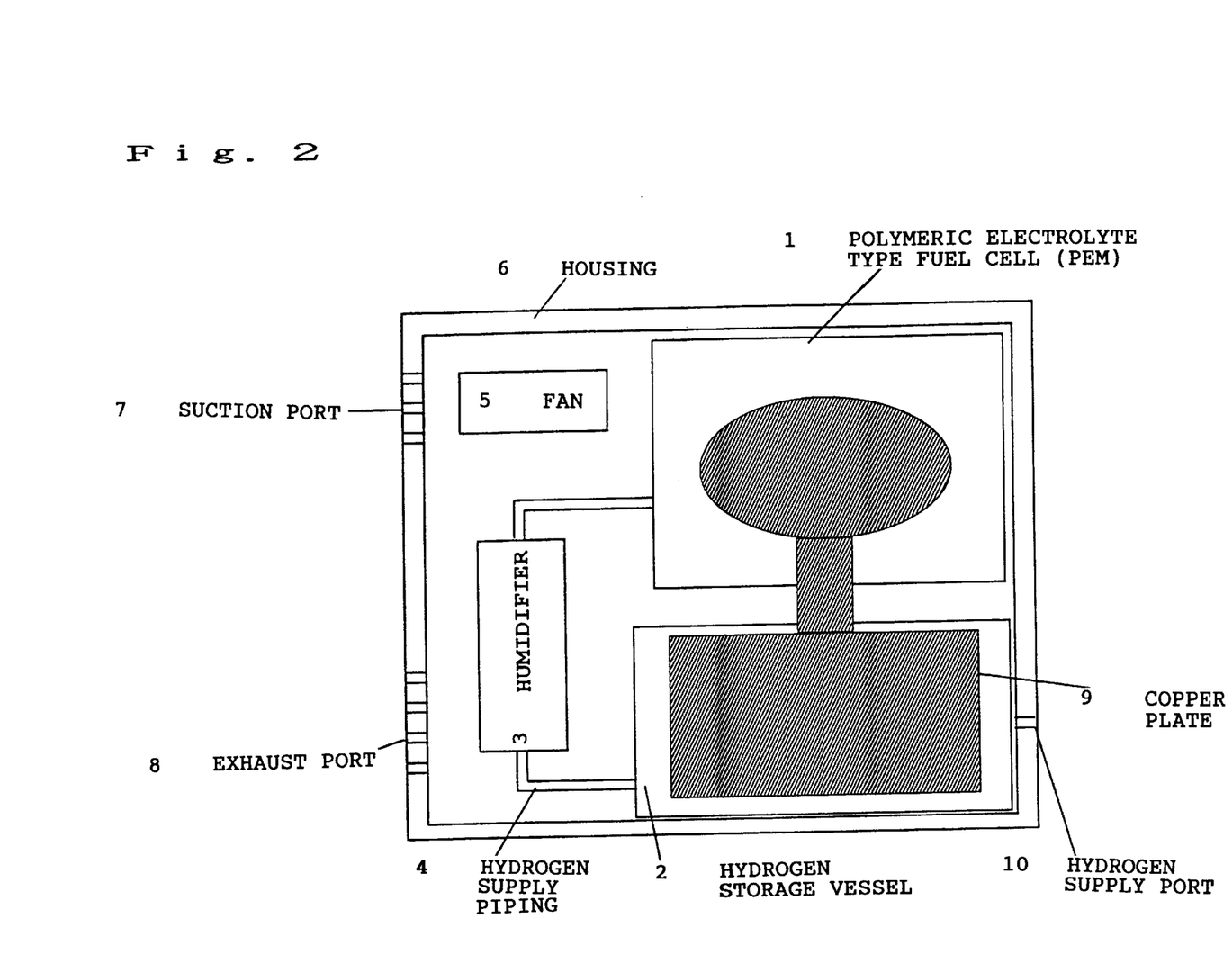
FIG. 2 is a second conceptual diagram of a fuel cell system which is a first embodiment of this invention.

FIG. 1 and FIG. 2 are conceptual diagrams of a fuel cell system which is a first embodiment of this invention. In FIG. 1 and FIG. 2, a polymeric electrolyte type fuel cell 1 (hereafter abbreviated as PEM) is adopted as a fuel cell body. Furthermore, a hydrogen storage vessel 2 made of a metal which stores hydrogen is connected to the PEM 1 by a hydrogen supply piping 4 provided with a humidifier 3 in the middle for humidifying the electrolyte membrane of the PEM 1. Also, there is a fan 5 for supplying air as an oxidant to the PEM 1, and these components are contained in a housing 6.

The housing 6 is preferably made of a plastic material of high heat insulation and excellent heat resistance so that the heat of PEM 1 will not affect outside. furthermore, the housing 6 has a suction port 7 and an exhaust port 8, and air is circulated by a fan 5. herefore, the air passes through the vicinity of the PEM 1 and is heated. There is a supplementary effect that the heated air heats the hydrogen storage vessel 2. The hydrogen storage vessel 2 also has a hydrogen supply port 10 installed thereon.

Furthermore, the PEM 1 and the hydrogen storage vessel 2 are connected by a copper plate 9 as a conductor of heat. This copper plate 9 can be substituted by other heat conductors such as an aluminum plate or a heat conducting sheet.

Also, by making the copper plate 9 of the same material as the hydrogen storage vessel 2, the hydrogen storage vessel 2 and the heat conductor can be of an integrated structure. By using such a structure, the conductivity of heat can be improved and the size of the system can be reduced.

Heat generated in the PEM 1 is transferred to the hydrogen storage vessel 2 through this copper plate 9, and elevates the temperature and pressure in the vessel. By this, hydrogen is well supplied to the PEM 1.

When hydrogen in the hydrogen storage vessel 2 is exhausted, hydrogen is supplemented through the hydrogen supply port 10.

In this constitution, since no supplementary heat sources are used such as a heater, the efficiency is improved.

Furthermore, since the PEM 1 is cooled by the endothermic reaction when the hydrogen absorbing alloys release hydrogen, no excessive heat is exhausted to exterior. Therefore, when used in electric appliances such as personal computers, there is an effect that heating by the system can be prevented.

If the copper plate is provided only on the central portion where temperature rise is large as FIG. 2 shows, the effect of making heat distribution constant can be obtained.

In this embodiment, when the hydrogen storage vessel 2 is operated at a temperature higher than an ordinary temperature, the same action and effect can be obtained from the same constitution used when the hydrogen storage vessel 2 is operated at a temperature lower than an ordinary temperature.

Embodiment 2

Figure 3:
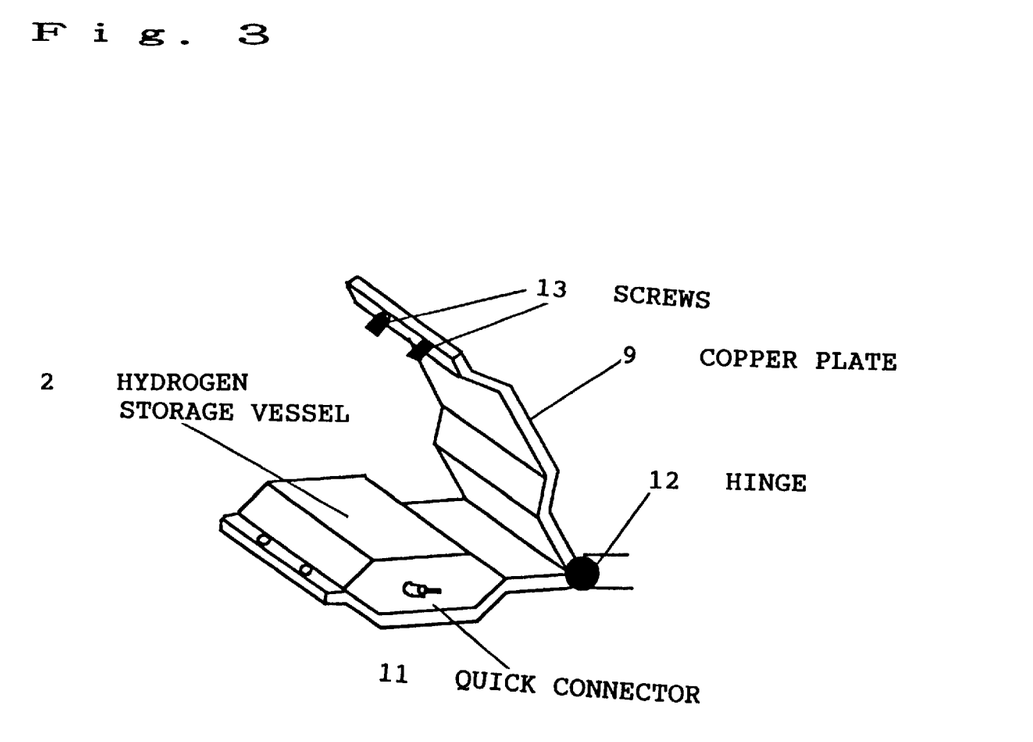
FIG. 3 is a perspective view of a hydrogen supply unit which is a second embodiment of this invention.

FIG. 3 is a perspective view of a hydrogen supply unit which is a second embodiment of this invention.

In FIG. 3, the hydrogen storage vessel 2 has a quick connector 11 installed thereto, and can be connected to a hydrogen supply piping (not shown in FIG. 3). Although this quick connector 11 is most preferred because of its simple handling, other attachable and detachable connecting means, such as a VCR connector may be used.

Further, a copper plate 9 which can be opened and closed using a hinge 12 and screws 13 encloses the hydrogen storage vessel 2 tightly. This copper plate 9 transfers heat generated by the PEM (not shown) in operation to the hydrogen storage vessel 2.

This copper plate 9 may be replaced by other conductors of heat such as aluminum plate as in the case of the first embodiment. Furthermore, the upper and lower parts of the copper plate 9 may be made attachable and detachable not only by the hinge 12 and screws 13, but by simple engaging or by an eyelet with a binder.

By the above constitution, only the hydrogen storage vessel 2 may be replaced when hydrogen in the hydrogen storage vessel 2 is exhausted. Therefore, effects such as the reduction of running costs, as well as decrease in the down time of the fuel cell system are obtained.

Embodiment 3

Figure 4:
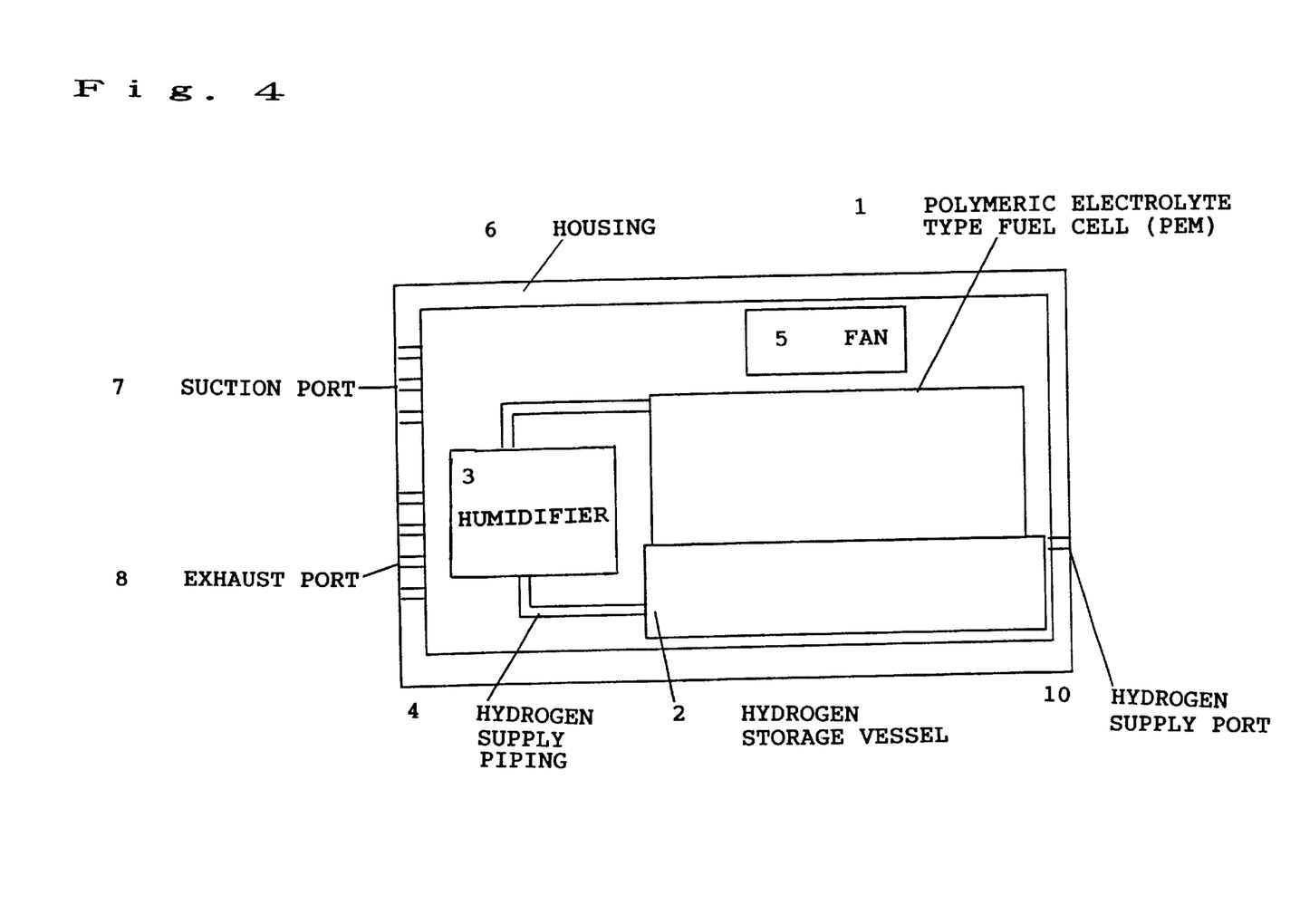
FIG. 4 is a conceptual diagram of a fuel cell system which is a third embodiment of this invention.

FIG. 4 is a conceptual diagram of a fuel cell system which is a third embodiment of this invention.

In FIG. 4, symbols same as in FIG. 1 represent elements having the same names and functions as in FIG. 1.

In this embodiment, the PEM 1 has almost the same size as the size of the hydrogen storage vessel 2, and the supply and receipt of heat is performed by the direct contact of the PEM 1 with the hydrogen storage vessel 2. By the above constitution, heat can be supplied and received efficiently and compactly without using a conductor of heat.

Embodiment 4

Figure 5:
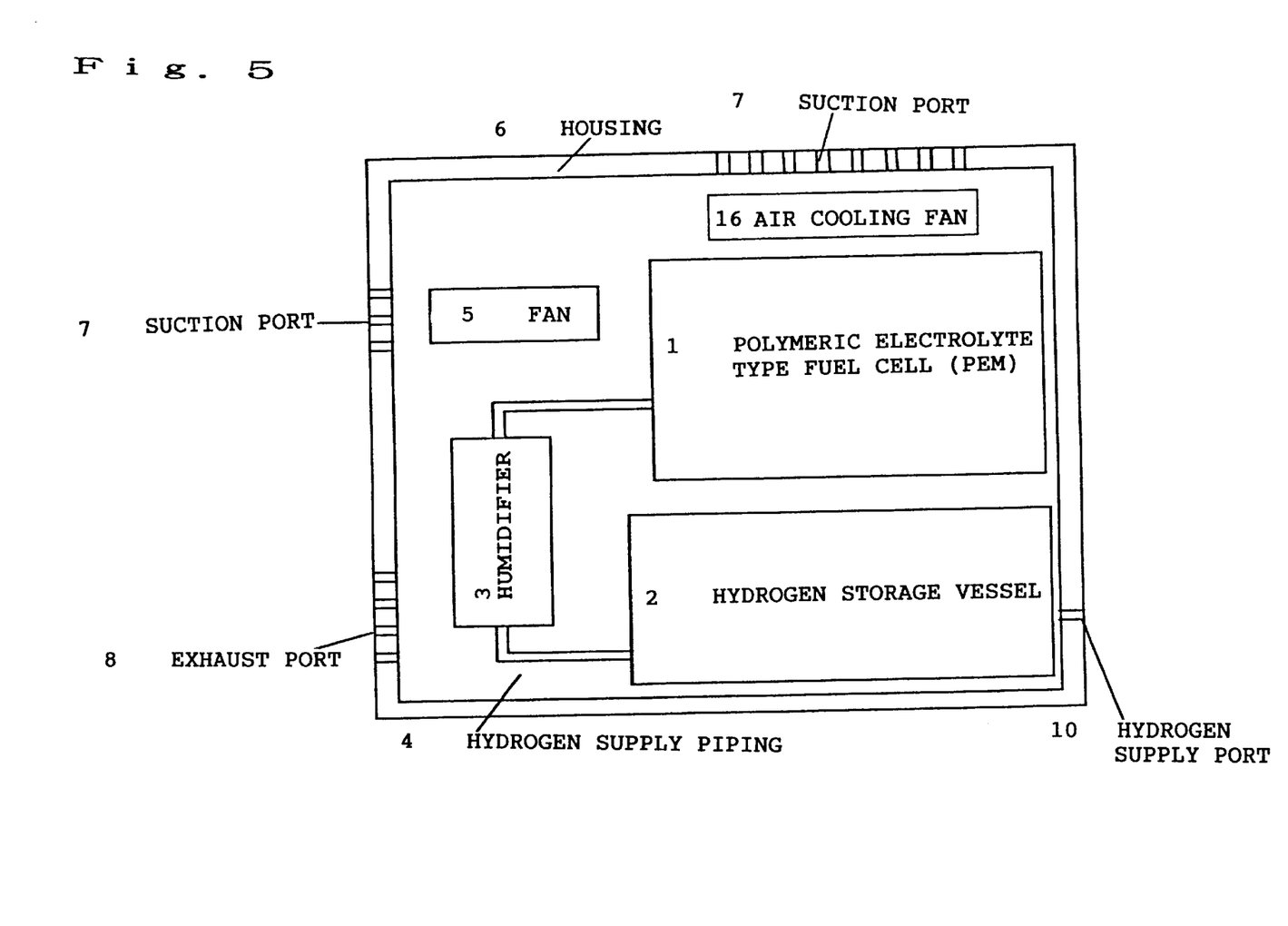
FIG. 5 is a first conceptual diagram of a fuel cell system which is a fourth embodiment of this invention.
Figure 6:
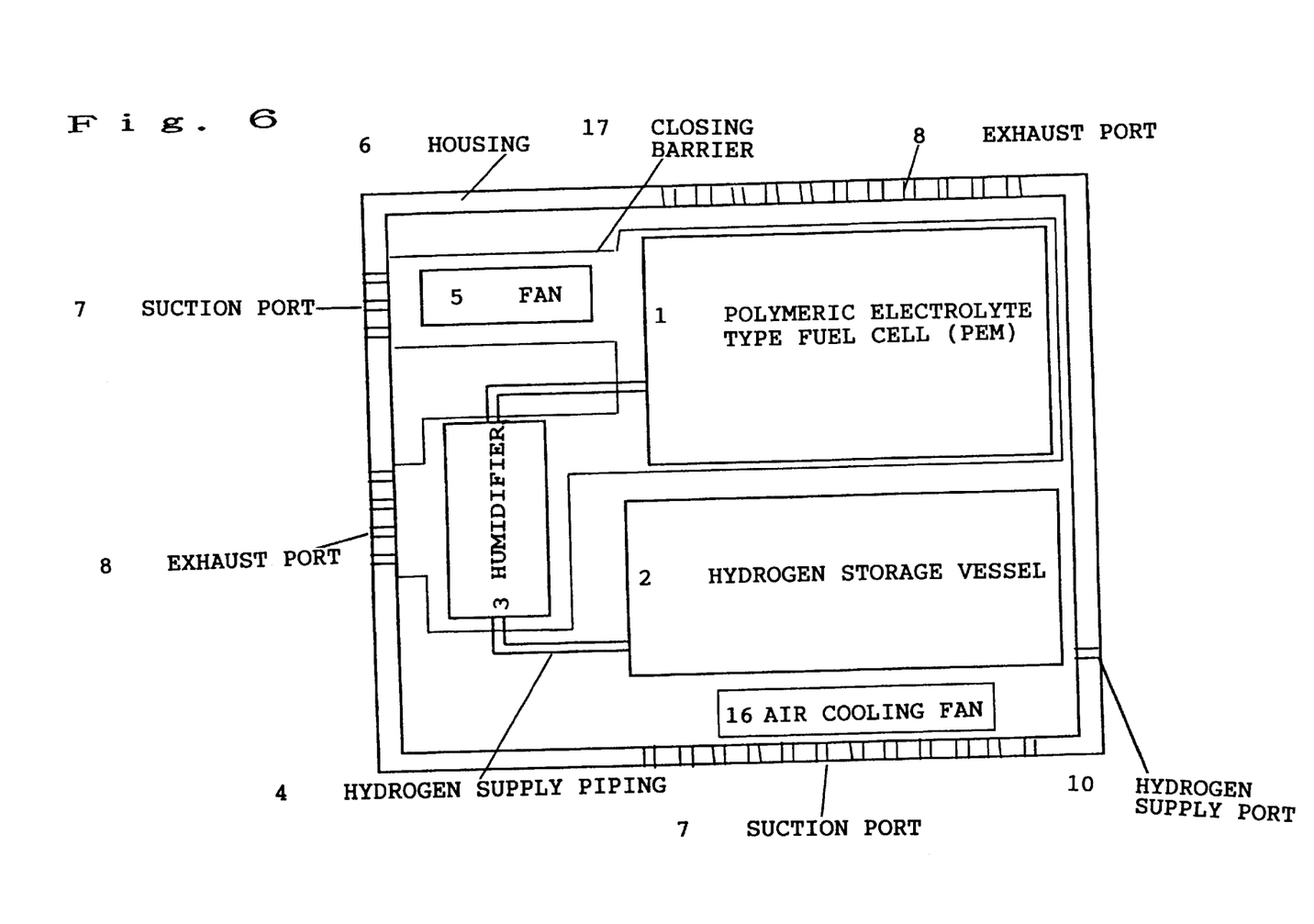
FIG. 6 is a second conceptual diagram of a fuel cell system which is a fourth embodiment of this invention.

FIG. 5 and FIG. 6 are conceptual diagrams of a fuel cell system which is a fourth embodiment of this invention.

In these figures, symbols same as in FIG. 1 represent elements having the same names and functions as in FIG. 1.

In FIG. 5, the hydrogen storage vessel 2 operates at a temperature higher than an ordinary temperature. An air cooling fan 16 first forces air introduced through the suction port 7 provided on the side of the PEM 1 as the figure shows against the PEM 1 to cool the PEM 1, and at the same time, gathers heat from the PEM 1 with the air, and heats the hydrogen storage vessel 2 using the heated air.

In FIG. 6, the hydrogen storage vessel 2 operates at a temperature lower than an ordinary temperature. An air cooling fan 16 first forces air introduced through the suction port 7 provided on the side of the hydrogen storage vessel 2 against the hydrogen storage vessel 2 to heat the hydrogen storage vessel 2, and at the same time, gathers cool air from the hydrogen storage vessel 2, and cools the PEM 1 using the cooled air. In this case, since the direction of air flow is opposite from the air flow from the fan 5 which supplies air as an oxidant to the PEM 1, a barrier 17 is provided to prevent mutual interference.

Embodiment 5

Figure 7:
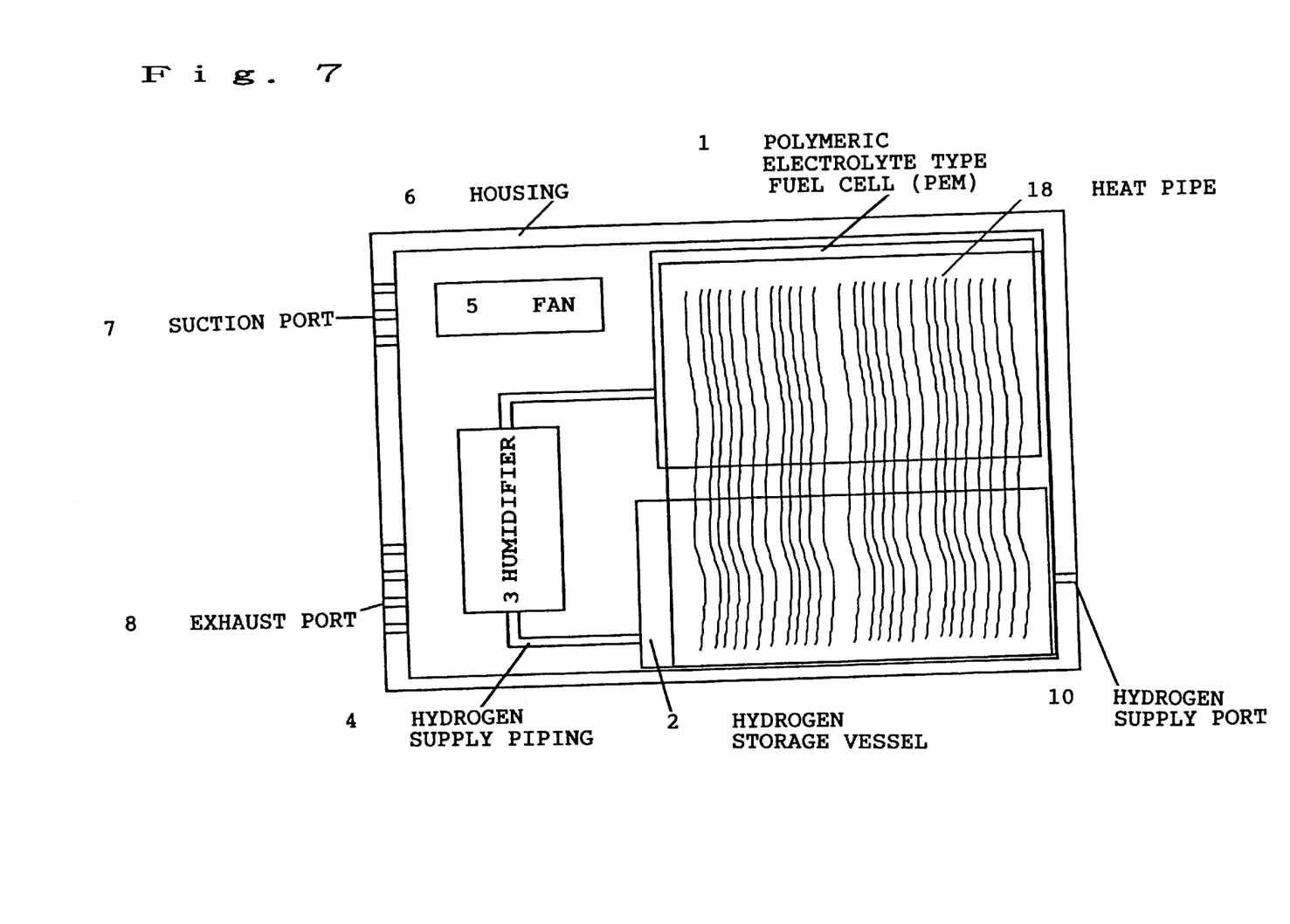
FIG. 7 is a conceptual diagram of a fuel cell system which is a fifth embodiment of this invention.

FIG. 7 is a conceptual diagram of a fuel cell system which is a fifth embodiment of this invention.

In FIG. 7, symbols same as in FIG. 1 represent elements having the same names and functions as in FIG. 1.

In this embodiment, the hydrogen storage vessel 2 is operated at a temperature higher than an ordinary temperature, particularly at almost the same temperature as the temperature of the PEM 1. In this case, although the costs increase, heat is supplied and received by a heat pipe 18. The heat pipe 18 is advantageous in that heat can be transferred even if the temperature gradient is small.

Embodiment 6

Figure 8:
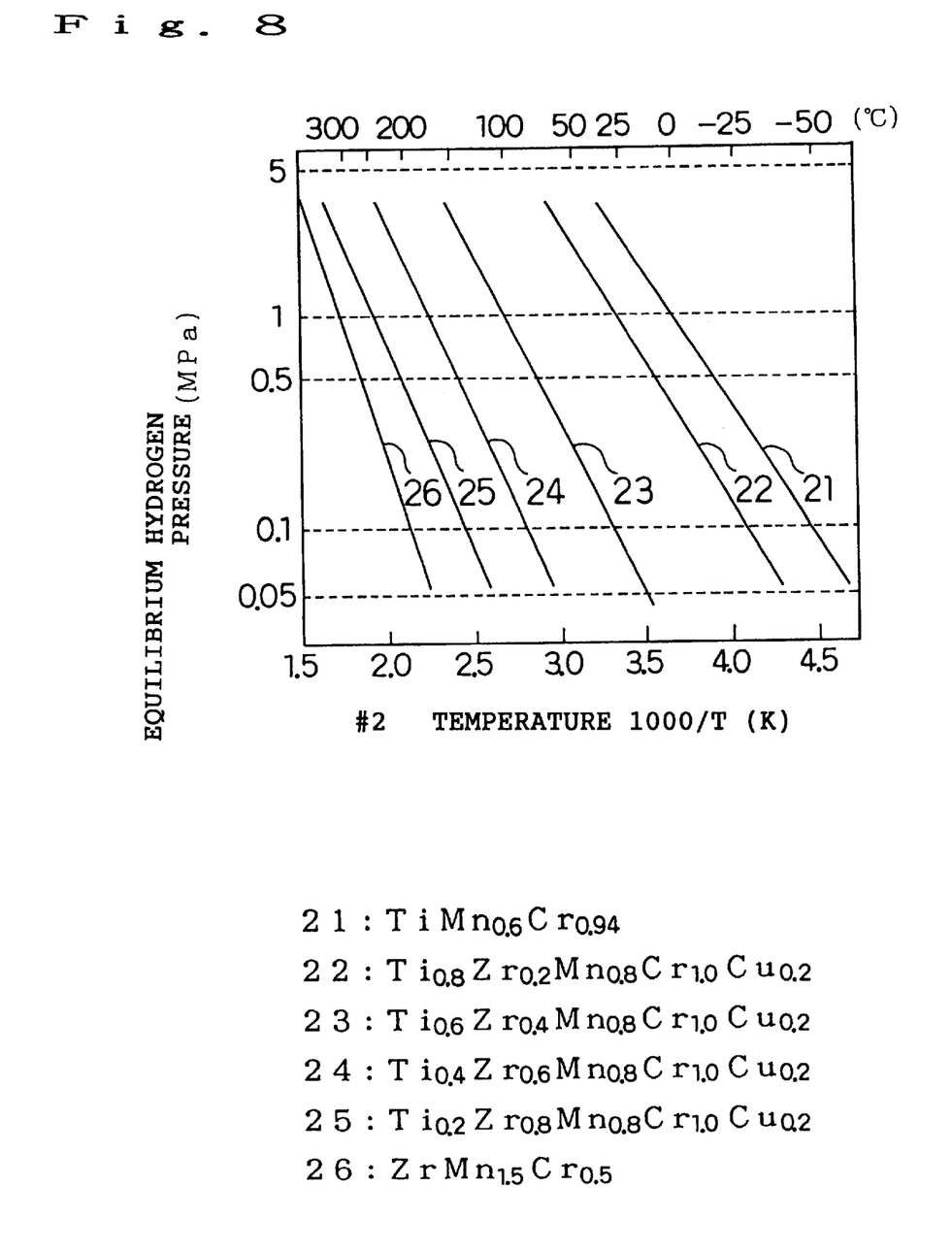
FIG. 8 is a diagram showing the temperature dependency of the equilibrium hydrogen pressure of AB 2-type Ti(Zr)-Mn-based hydrogen absorbing alloys.

FIG. 8 is a diagram showing the temperature dependency of the equilibrium hydrogen pressure of $AB_2$-type Ti(Zr)-Mn-based hydrogen absorbing alloys. As the figure shows, in $AB_2$-type Ti(Zr)-Mn-based hydrogen absorbing alloys, since the equilibrium pressure of hydrogen can be varied continuously by varying the composition (chiefly the Ti:Zr ratio), the pressure can be 10 $kg/cm^2g$ or below according to the operating temperature used.

In this way, the safety of fuel cell systems can be improved by selecting the most adequate hydrogen absorbing alloys while supplying hydrogen smoothly.

Possibility of Industrial Applications

According to this invention as described above, the hydrogen storage vessel can be heated efficiently even in polymeric electrolyte type fuel cells.

Moreover, the exhausted heat from the systems may be minimized.

If the hydrogen storage vessel can be attached to or detached from the main part of a small system, only the hydrogen storage vessel can be replaced for supplementing hydrogen. Therefore, effects such as the reduction of running costs, as well as decrease in the down time of the fuel cell system are obtained.

The safety of fuel cell systems is also improved.

We claim:

1. A fuel cell system comprising:
a polymeric electrolyte fuel cell body,
a hydrogen storage vessel containing hydrogen absorbing alloys,
a hydrogen supply piping for supplying hydrogen from said hydrogen storage vessel to said fuel cell, and said fuel cell body and said hydrogen storage vessel directly contacting each other through a thermally conductive plate so that heat can be supplied and received.

2. A fuel cell system as claimed in claim 1, wherein said conductive plate is integrated with said hydrogen storage vessel.

3. A fuel cell system comprising:
a polymeric electrolyte fuel cell body,
a hydrogen storage vessel containing hydrogen absorbing alloys, said hydrogen storage vessel directly contacting said fuel cell body so that heat can be supplied and received,
a hydrogen supply piping for supplying hydrogen from said hydrogen storage vessel to said fuel cell, and
an air cooling fan for providing supplementary thermal connection between said fuel cell body and said hydrogen storage vessel so that heat can be supplied and received.

4. A fuel cell system comprising:
a polymeric electrolyte fuel cell body,
a hydrogen storage vessel containing hydrogen absorbing alloys, and
a hydrogen supply piping for supplying hydrogen from said hydrogen storage vessel to said fuel cell,
wherein said fuel cell body and said hydrogen storage vessel have a structure to directly contact one another so that heat can be supplied and received.

5. A fuel cell system as claimed in any one of claims 1, 2 or 4, wherein in addition to said mechanism for thermally connecting said fuel cell body and said hydrogen storage vessel so that heat can be supplied and received, a fan is provided as a supplementary means for thermally connecting said fuel cell body and said hydrogen storage vessel so that heat can be supplied and received, said fan also supplying air to said fuel cell body.

6. A fuel cell system as claimed in any one of claims 1, 3, or 4, wherein said hydrogen storage vessel is a vessel having a structure attachable to and detachable from the main part of the system.

7. A fuel cell system as claimed in any one of claims 1, 2, 3 or 4, wherein said conductive plate is a metallic plate and, when the temperature of said hydrogen storage vessel is an ordinary temperature or above, said conductive plate transferring heat generated by said polymeric electrolyte fuel cell body to said hydrogen storage vessel.

8. A fuel cell system as claimed in any one of claims 1, 2, 3 or 4, wherein said conductive plate is a metallic plate and, when the temperature of said hydrogen storage vessel is an ordinary temperature or below, said conductive plate cooling said polymeric electrolyte fuel cell body by endothermic reaction within said hydrogen storage vessel.

9. A fuel cell system as claimed in any one of claims 1, 2, 3 or 4, wherein equilibrium hydrogen pressure of hydrogen absorbing alloys in said hydrogen storage vessel is 10 $kg/cm^2g$ or below at an operating temperature of said hydrogen storage vessel.

10. A fuel cell system as claimed in claim 9, wherein said hydrogen absorbing alloys have $AB_2$ Laves phase structure.

* * * * *